United States Patent Office 3,441,420
Patented Apr. 29, 1969

3,441,420
INK FORMULATION
Calvin T. Hollowood, Inkster, Mich., assignor to Burroughs Corporation, Detroit, Mich., a corporation of Michigan
No Drawing. Continuation of application Ser. No. 326,385, Nov. 27, 1963. This application Dec. 11, 1967, Ser. No. 689,254
Int. Cl. C09d 11/14
U.S. Cl. 106—26      11 Claims

ABSTRACT OF THE DISCLOSURE

A fast setting ink composition for use in high speed printing systems where the ink is transferred from high speed rotating printing drums or wheels to paper documents successively fed thereto. The ink composition comprises a special combination of coloring material, nitrocellulose binder and polyglycol carrier solvent, the relative proportions of which are so designed as to avoid ink throw-off from the high speed moving parts of the printer and to prevent smudging and offsetting. The components of the ink formulation are combined under particular conditions and the resulting ink composition is printable upon paper documents without the assistance of externally applied heat.

---

This application is a continuation of my application for U.S. application Ser. No. 326,385, filed Nov. 27, 1963, and entitled Ink Formulation, now abandoned.

BACKGROUND OF THE INVENTION

This system relates to an ink for use in a high speed printing system wherein the ink is transferred from a printing drum or wheel rotating at several thousand revolutions per minute.

In modern high speed bank check processing machines, the checks are automatically sorted and endorsed at the rate of fifteen hundred items per minute. To provide endorsements at this rate, a rotary printing wheel or drum is employed. Illustrative of such mechanism is the fountain ink roller and supply device disclosed in the U.S. patent to Davis, No. 3,194,155, of common ownership herewith. In the past, numerous problems have arisen in the use of high speed rotary printing system due to the fact that the ink did not adhere to the revolving drum and would be thrown off, producing smudging or undesired background printing. The high speed with which the printer operated was also conducive to ink smearing on the face of the freshly printed item with concomitant offsetting of the wet ink onto the back of the succeeding item.

To overcome these difficulties, attempts have been made to control the ink feed rate to the printing device, to provide high temperature drying of the ink immediately after application to the endorsed item and also to coat the endorsed item with wax to prevent offsetting. None of the efforts have been altogether successful.

OBJECTIVES AND SUMMARY OF THE INVENTION

It is, therefore, an object of the present invention to provide an improved printing ink for use in high speed endorsing system in modern automatic check processing machines.

It is another object of the present invention to provide a printing ink for use in high speed printing systems through which ink throw-off, smearing, and offsetting are eliminated.

In the present invention, through a unique combination of materials in the ink, the aforementioned objects have been attained, producing a superior ink for use in high speed printing systems. The improved ink consists of a coloring material, a resinous binder and a solvent.

In the ink of the present invention, organic dyes are preferably employed. A small amount of nitrocellulose is included, as a resinous binder, to provide the ink composition with the desirable adhesion and viscosity. The selected organic dye and the nitrocelloluse component are both dissolved in a fluid carrier which is not harmful to the nonmetallic parts of the printing mechanism. In developing this ink formulation, it was found that polyglycol compounds, and particularly dipropylene glycol, were very efficacious for dissolving the coloring matter and the nitrocellulose, resulting in an ink which is uniform in color and will not separate on standing or in passing through the feed system of the printing mechanism and which has the desirable trait of setting quickly without additional heat.

In a high speed check endorsing machine, it is convenient to apply the ink to the printing drum by means of an ink wheel. The ink wheel continuously contacts the rotating drum, suppying ink to the printing surface. As described in the aforesaid patent, the ink wheel has a porous body made up of numerous capillary paths leading from within the wheel to the surface. The printing ink is fed from an ink reservoir to the center of the ink wheel from which, through a combination of centrifugal force and capillary action, the ink passes through the porous body of the ink wheel. A soluble organic dye has been selected for use in the ink to obviate any problem of ink separation in passing through the porous ink wheel. The ink reaches the surface of the wheel at a uniform rate and is evenly distributed thereon.

An additional advantage in using soluble organic dyes is that it is relatively easy to formulate inks in the four basic colors recommended by the American Banking Association. The recommended colors for endorsing inks are Green for Federal Reserve Banks and Branches, Black for Correspondent Banks, Purple for Clearing Houses, and Red for all other banks. These colors can be prepared using readily available polyglycol soluble organic dyes.

Generally, the preferred dyes for use in the endorsing ink composition are the azo, triphenylmethane, xanthene and iosol dyes. These dyes are used singly or in combination to produce the desired color and intensity. The iosol dyes are acid dyes that have been condensed with high molecular weight amines. Examples of other dyes suitable for use in the endorser inks are: mono-azo dyes such as Spirit Yellow, Fast Yellow, Methyl Orange and Bordeaux B (red); the secondary dis-azo dyes such as Cloth Red 2R and Fast Black L, the triphenylmethane dyes such as Fuchsine (red), Malachite Green, Crystal Violet, and Victoria Blue; the xanthene dyes such as Fluorscein and Rhodamine B. In general, dyes which are soluble in the polyglycol solvent are acceptable for use in the ink composition, the choice of dye being dependent only on the color desired.

It was found through experimentation in connection with this invention that ink throw-off from a rapidly rotating printing drum can be prevented if a thin film of ink is used which has a specific molecular adhesion for the surface of the drum. Several soluble, viscosity developing, film forming agents were tested in an attempt to form a stable film of ink approximately one mil in thickness on the printing drum. The experimentation revealed that cellulose esters, particularly nitrocellulose, could provide such a thin, stable ink film. The viscosity of the nitrocellulose may range from 18 through 35 centipoises and ¼ second through 400 seconds and may have a nitrogen content from 11 to 12%. Nitrocellulose of the AS, RS, and SS types was found suitable with the SS type being the most desirable due to the high solubility in glycols.

The nitrocellulose is classified as SS, AS, or RS depending on its nitrogen content. Type SS has an average nitrogen content of 11%. Type AS has an average nitrogen content of 11.5%, and type RS has an average nitrogen content of 12%. The nitrocellulose is usually supplied by the manufacturer in an alcohol solvent. Nitrocellulose wet with denatured ethyl alcohol, isopropyl alcohol and n-butyl alcohol has been used successfully. The major portion of the wetting alcohol is lost by evaporation during the processing of the ink at elevated temperatures.

It was also found in the experimentation concerning this invention that the use of a nitrocellulose modified-glycol based ink decidedly reduced smudge or offset commonly associated with high speed print endorsing systems. Glycols were selected for use as solvents in the ink composition due to their compatibility with the rubber and plastic parts of the endorsing system and also due to their fast setting rate under the ambient conditions in the machine. The glycols were also found to dissolve the dyes and nitrocellulose with no ternary solubility problems. The glycol can be propylene or polyglycol in nature and can be diglycol or polyglycol in structure. The following glycols have been evaluated and found suitable for use in the ink composition: dipropylene, tripropylene and the polyethylene glycols of molecular weights 200 through 600. The polypropylene glycols of molecular weights 150 through 425 can also be utilized.

Desirable endorsing ink composition of the present invention contain, by weight percent, from 1 to 25% of organic dye, from 4 to 12% of nitrocellulose and the remainder a glycol solvent. The ink exhibits the characteristic of being quick drying, that is, it requires no external heating means but sets rapidly under the ambient conditions within the machine. The quick drying characteristic results from the quick setting quality of the ink composition, the ink being quickly absorbed into the paper documents. The formulas for the ink take into account the moisture content of the endorsed item, the temperature of the machine, and the absorption of the ink into the document to prevent smearing and offsetting. The viscosity of the ink can be varied from 200 centipoises to 50,000 centipoises at 78 degrees Fahrenheit with a surface tension of from 35 to 40 dynes per centimeter for various environmental situations.

The invention will be further illustrated by the following specific examples. The examples are presented on a percentage by weight basis. The percentage of nitrocellulose is given on a dry basis, the preferable percentage being from 8 to 10%.

Example 1

| Black ink (1): | Percent |
| --- | --- |
| Dipropylene glycol | 40 |
| Polyethylene glycol (molecular weight 300) | 40 |
| Nitrocellulose (¼ sec. SS type) (solids) | 9 |
| Fast Black L | 11 |

Example 2

| Green ink (1): | Percent |
| --- | --- |
| Tripropylene glycol | 70 |
| Nitrocellulose (½ sec. RS type) (solids) | 10 |
| Malachite Green | 18 |
| Fast Black L | 2 |
| Green ink (2): | |
| Dipropylene glycol | 40 |
| Polyethylene glycol (molecular weight 200) | 40 |
| Nitrocellulose (¼ sec. SS type) (solids) | 9 |
| Malachite Green | 10 |
| Fast Black L | 1 |

Example 3

| Red ink (1): | Percent |
| --- | --- |
| Tripropylene glycol | 67 |
| Nitrocellulose (½ sec. AS type) (solids) | 8 |
| Fuchsine | 25 |
| Red ink (2): | |
| Dipropylene glycol | 39 |
| Polyethylene glycol (molecular weight 300) | 39 |
| Nitrocellulose (¼ sec. SS type) (solids) | 8 |
| Bordeaux B | 13 |
| Fast Black L | 1 |
| Red ink (3): | |
| Dipropylene glycol | 39 |
| Polyethylene glycol (molecular weight 300) | 39 |
| Nitrocellulose (¼ sec. SS type) (solids) | 8 |
| Red acid dye amine condensate | 13 |
| Spirit Fast Black L | 1 |

Example 4

| Purple ink (1): | Percent |
| --- | --- |
| Dipropylene glycol | 40 |
| Tetraethylene glycol | 40 |
| Nitrocellulose (½ sec. AS type) (solids) | 8 |
| Crystal Violet | 12 |
| Purple ink (2): | |
| Dipropylene glycol | 39 |
| Polyethylene glycol (molecular weight 300) | 39 |
| Nitrocellulose (¼ sec. SS type) (solids) | 8 |
| Crystal Voilet | 10 |
| Fast Black | 4 |

In the preparation of the ink formulations, a solution of nitrocellulose in a glycol solvent and a solution of organic dye in a glycol solvent are first prepared utilizing heat and high speed agitation for maximum solubility. Care should be exercised in the preparation of these solutions to prevent coagulation of the nitrocellulose or caking of the organic dye due to insufficient dispersion in the solvent. The two solutions are combined while hot by slowly adding the nitrocellulose solution to the dye solution with high speed agitation. In the preparation of the nitrocellulose solution, the solution temperature should not be allowed to go above 225° F. and the solution should not be heated for longer than two hours. If these precautions are not followed, a reduced viscosity effect will take place and the resultant ink viscosity will be low because of heat deterioration of the nitrocellulose molecule. The mixture is then agitated for approximately fifteen minutes to assure thorough mixing. After cooling to room temperature, the ink is then filtered to remove any insoluble material larger than 10 microns. The ink is now ready for use in the endorser system.

I claim:

1. A printing ink composition for use in high speed printing applications consisting of from 1 to 25% of a coloring component, from 4 to 12% of resinous binder component, and the remainder a solvent component wherein said coloring component is selected from the group consisting of azo, triphenylmethane, xanthene dyes, and acid dyes condensed with high molecular weight amines and mixtures thereof, said resinous binder is a nitrocellulose selected from the group consisting of SS type nitrocellulose having an average nitrogen content of 11%, AS type nitrocellulose having an average nitrogen content of 11.5%, and RS type nitrocellulose having an average nitrogen content of 12%, all of said nitrocellulose compounds having a viscosity from 18 through 35 centipoises and ¼ second to 400 seconds, and said solvent component is polyglycol selected from the group consisting of dipropylene glycol, tripropylene glycol, polyethylene glycol of molecular weight 200 through 600 and polypropylene glycol of molecular weight 150 through 425 and mixtures thereof.

2. An ink for use in high speed printing systems where rapid setting is desired and smearing and offsetting are to be eliminated consisting of, in weight percent, from 4 to 12% of nitrocellulose having an average nitrogen content between 11 and 12% and a viscosity from 18 through 35 centipoises and ¼ second to 400 seconds, polyglycol solvent selected from the group consisting of dipropylene glycol, tripropylene glycol, polyethylene glycol of molecular weight 200 through 600 and polypropylene glycol of molecular weight 150 through 425 and mixtures thereof, and from 1 to 25% of coloring matter soluble in the polyglycol solvent.

3. A printing ink composition having a high absorptive characteristic for use in high speed document printing systems where rapid setting is desired and smearing and offsetting are to be eliminated, said ink consisting of, in weight percent, from 4 to 12% of nitrocellulose having an average nitrogen content between 11 and 12% and a viscosity from 18 through 35 centipoises and ¼ second to 400 seconds, polyglycol solvent selected from the group consisting of dipropylene glycol, tripropylene glycol, and polyethylene glycol of molecular weight 200 through 600 and polypropylene glycol of molecular weight 150 through 425 and mixtures thereof, and an organic coloring dye soluble in the polyglycol solvent.

4. The method of preparing an ink formulation comprising the steps of:
    dissolving, by weight percent, from 1 to 25% of a coloring component selected from the group consisting of azo, triphenylmethane, xanthene dyes, and acid dyes condensed with high molecular weight amines and mixtures thereof, into a solvent component comprising polyglycol selected from the group consisting of dipropylene glycol, tripropylene glycol, polyethylene glycol of molecular weight 200 through 600 and polypropylene glycol of molecular weight 150 through 425 and mixtures thereof;
    dissolving, by weight percent, from 4 to 12% of resinous binder component comprising nitrocellulose selected from the group consisting of SS type nitrocellulose having an average nitrogen content of 11%, AS type nitrocellulose having an average nitrogen content of 11.5%, and RS nitrocellulose having an average nitrogen content of 12%, all of said nitrocellulose compounds having a viscosity from 18 through 35 centipoises and ¼ second to 400 seconds, into a solvent component of like kind to that employed for disolving the coloring component;
    agitating the coloring component solution while subject to heat to obtain maximum solubility;
    agitating the resinous binder component solution while subject to heat less than 225° F. and for a period of time less than approximately two hours to obtain maximum solubility;
    slowly adding the resinous binder solution to the coloring component solution while both solutions are so heated;
    agitating the resultant solution to assure thorough mixing;
    cooling the mixed solution to room temperature; and
    filtering the cooled solution to remove any insoluble material larger than 10 microns.

5. A method of applying ink to paper documents including the steps of:
    placing the ink on the periphery of a rotating printing drum, said ink consisting of from 1 to 25% of a coloring component, from 4 to 12% of resinous binder component, and the remainder a solvent component wherein said coloring component is selected from the group consisting of azo, triphenylmethane, xanthene dyes, and acid dyes condensed with high molecular weight amines and mixtures thereof, said resinous binder is a nitrocellulose selected from the group consisting of SS type nitrocellulose having an average nitrogen content of 11%, AS type nitrocellulose having an average nitrogen content of 11.5% and RS type nitrocellulose having an average nitrogen content of 12%, all of said nitrocellulose compounds having a viscosity from 18 through 35 centipoises and ¼ second to 400 seconds, and said solvent component is polyglycol selected from the group consisting of dipropylene glycol, tripropylene glycol, polyethylene glycol of molecular weight 200 through 600 and polypropylene glycol of molecular weight 150 through 425 and mixtures thereof;
    applying the ink wetted drum to paper documents successively fed thereto and under ambient conditions without the application of external heat.

6. A method of applying ink to paper documents moving at a high speed including the steps of:
    placing the ink on the periphery of a rapidly rotating printing drum, said ink consisting of, in weight percent, from 1 to 25% of an organic dye, from 4 to 12% of nitrocellulose, and the remaining polyglycol solvent;
    applying the ink wetted drum to paper documents successively fed thereto without the application of external heat.

7. A printing ink composition having a high absorptive characteristic for use in high speed document printing systems where rapid setting is desired and smearing and offsetting are to be eliminated, said ink consisting of in weight percent from 1 to 25% of a coloring component, from 8 to 10% of resinous binder component, and the remainder a solvent component wherein said coloring component is selected from the group consisting of azo, triphenylmethane, xanthene dyes, and acid dyes condensed with high molecular weight amines and mixtures thereof, said resinous binder is a nitrocellulose selected from the group consisting of SS type nitrocellulose having an average nitrogen content of 11%, AS type nitrocellulose having an average nitrogen content of 11.5%, and RS type nitrocellulose having an average nitrogen content of 12%, all of said nitrocellulose compounds having a viscosity from 18 through 35 centipoises and ¼ second to 400 seconds, and said solvent component is polyglycol selected from the group consisting of dipropylene glycol, tripropylene glycol, polyethylene glycol of molecular weight 200 through 600 and polypropylene glycol of molecular weight 150 through 425 and mixtures thereof.

8. The printing ink composition of claim 7 wherein the coloring component consists of, in weight percent, from 1 to 25% of an azo dye.

9. The printing ink composition of claim 7 wherein the coloring component consists of, in weight percent, from 1 to 25% of a triphenylmethane dye.

10. The printing ink composition of claim 7 wherein the coloring component consists of, in weight percent, from 1 to 25% of a xanthene dye.

11. The printing ink composition of claim 7 wherein the coloring component consists of, in weight percent, from 1 to 25% of acid dyes.

References Cited

UNITED STATES PATENTS

| | | | |
|---|---|---|---|
| 1,833,086 | 11/1931 | Middleton | 106—26 XR |
| 1,931,485 | 10/1933 | Caprio et al. | 106—26 |
| 2,207,278 | 2/1937 | Kelly | 106—26 |
| 2,081,949 | 6/1937 | Mock | 106—26 XR |
| 2,128,672 | 8/1938 | Gessler | 106—26 |
| 2,361,442 | 10/1944 | Wolfe et al. | 106—26 |
| 2,537,531 | 1/1951 | Hoyt | 106—26 XR |
| 2,820,710 | 1/1958 | Buckwalter et al. | 106—26 |
| 2,868,741 | 1/1959 | Chambers et al. | 106—26 XR |

FOREIGN PATENTS 462,924  3/1937  Great Britain.

OTHER REFERENCES

Larsen: Industrial Printing Inks, New York, Reinhold Pub. Corp., 1962 (pages 101–2).

JULIUS FROME, *Primary Examiner.*

JOAN B. EVANS, *Assistant Examiner.*

U.S. Cl. X.R.

106—193, 195